(12) United States Patent
Garabandic

(10) Patent No.: US 7,660,139 B2
(45) Date of Patent: Feb. 9, 2010

(54) OUTPUT POWER FACTOR CONTROL OF PULSE-WIDTH MODULATED INVERTER

(75) Inventor: Djordje Garabandic, Burnaby (CA)

(73) Assignee: Xantrex International, St. Michael (BB)

( * ) Notice: Subject to any disclaimer, the term of this patent is extended or adjusted under 35 U.S.C. 154(b) by 316 days.

(21) Appl. No.: 11/630,139

(22) PCT Filed: Jun. 21, 2004

(86) PCT No.: PCT/CA2004/000915

§ 371 (c)(1),
(2), (4) Date: Dec. 20, 2006

(87) PCT Pub. No.: WO2005/124498

PCT Pub. Date: Dec. 29, 2005

(65) Prior Publication Data

US 2007/0247876 A1 Oct. 25, 2007

(51) Int. Cl.
*H02M 7/162* (2006.01)
(52) U.S. Cl. .................................. 363/98
(58) Field of Classification Search ............ 363/15, 363/16, 17, 34, 37, 42, 95, 98, 131, 132, 363/136
See application file for complete search history.

(56) References Cited

U.S. PATENT DOCUMENTS

| 4,507,724 A * | 3/1985 | Glennon ............... 363/98 |
| 5,625,539 A * | 4/1997 | Nakata et al. ............ 363/17 |
| 6,535,403 B1 | 3/2003 | Jungreis et al. |
| 6,995,996 B2 * | 2/2006 | Youm ................... 363/98 |
| 7,336,512 B2 * | 2/2008 | Geissler ................ 363/89 |

FOREIGN PATENT DOCUMENTS

JP          60 180478 A          9/1985

OTHER PUBLICATIONS

Xiaoi-Eng Sun et al., "A Research on PhotovoltaJc Energy Controlling~System with Maximum Power Point Tracking", Power Conversion Conference 2002. PCC-Osaka 2002, Proceedings of the Osaka, Japan Apr. 2-5, 2002, Piscataway, N J, USA, IEEE, US, vol. 2, Apr. 2, 2002, pp. 822-826 XP010590259 ISBN: 0-7803-7156-9.*

(Continued)

*Primary Examiner*—Adolf Berhane
*Assistant Examiner*—Yemane Mehari

(57) ABSTRACT

An inverter operable to supply high power factor electrical power to an AC load including an AC power grid includes a DC bus and a DC to AC converter section of the full bridge type. The inverter further includes a voltage sensor configured to produce an instantaneous output voltage signal representing instantaneous output voltage of the inverter, a rectification circuit configured to produce a rectified output voltage signal, a power signal generator, an output current sensor configured for sensing an output current of the inverter, a rectification circuit configured to produce the rectified output current signal, a sign circuit for producing a signal representing the sign of the output voltage and a control apparatus. The control apparatus includes a scaled rectified voltage signal generator, a pulse width modulation (PWM) signal generator configured to produce a pulse width modulation signal in response to the scaled rectified voltage signal and the rectified output current signal and a switching leg controller circuit configured to control the full bridge switches.

54 Claims, 6 Drawing Sheets

OTHER PUBLICATIONS

Xiaofeng Sun et al., "A Research on Photovoltaic Energy Controlling System with Maximum Power Point Tracking", Power Conversion Conference 2002. PCC-Osaka 2002, Proceedings of the Osaka, Japan Apr. 2-5, 2002, Piscataway, NJ, USA, IEEE, US, vol. 2, Apr. 2, 2002, pp. 822-826 XP010590259 ISBN: 078037156-9.

Todd P. C., "UC3854 Controlled Power Factor Correction Circuit Design", Integrated Circuits, Unitrode Application Note, Merrimack, NH, US, 1999, pp. 3-269-3-289, XP002179640.

"High Power Factor Preregulator UC3854", Announcement Texas Instruments, Jun. 1998, pp. 1-8, XP002199724.

"Advanced High-Power Factor Preregulator", Texas Instruments, SLUS329A, Jun. 1998—Revised Aug. 2003, pp. 1-10.

"PFC Controller for low to medium power applications requiring compliance with IEC 1000-3-2", Texas Instruments, UCC28051, http://focus.ti.com/docs/prod/folders/print/ucc28051.html.

Balogh, Laszlo, "Unitrode—UC3854A/B and UC3855A/B Provide Power Limiting With Sinusoidal Input Current for PFC Front Ends", SLUA196A, Jun. 1995-Revised Nov. 2001, pp. 1-5.

Andreycak, Bill, "UC3854A and UC3854B Advanced Power Factor Correction Control Ics", Unitrode, pp. 1-3.

* cited by examiner

| SIGN | A | B | C | D |
|---|---|---|---|---|
| 0 | 1 | 0 | 0 | PWM |
| 1 | 0 | PWM | 1 | 0 |

OUTPUT POWER FACTOR CONTROL OF PULSE-WIDTH MODULATED INVERTER

BACKGROUND OF THE INVENTION

1. Field of Invention

This invention relates to supplying power to an alternating current (AC) load, particularly an AC grid, from a direct current (DC) source. More particularly, the invention relates to methods and apparatus for controlling switching legs of a switching circuit of an inverter to supply high power factor electrical power to a load.

2. Description of Related Art

As energy demands of consumers and industry increase, alternative forms of energy are becoming increasingly accepted and developed. One of these alternative forms of energy is solar energy. Solar energy is often harvested through the use of one or more photovoltaic panels, which produce direct current (DC) power from the sun's energy. The sun's energy impinges upon a photovoltaic panel and can provide a readily available energy source in climates subject to high amounts of solar radiation. A photovoltaic panel or a plurality of such panels, known as an array, can produce more energy than may be required or demanded therefrom and thus while energy is available, it may not be used. To avoid wasting or not making use of this readily available energy, provisions are often made to supply electrical power into the AC utility grid from which most consumers and industry draw power. In some areas, photovoltaic arrays are totally devoted to supplying power to the AC utility grid.

Standards have been developed for supplying power to the AC grid, to ensure power is supplied in a manner that will not disrupt the operation of the grid or devices connected thereto. In particular, standards have been set for the phase relationship of voltage and current produced by devices that supply power to the grid. These standards require power to be supplied at near unity power factor, i.e. voltage and current in phase with that of the grid. Consequently, devices that supply power to the grid often have AC power factor correction circuits to ensure the output voltage/output current phase relationship is at or near unity. Typically, these circuits are implemented in digital or analog designs. Digital designs often employ digital signal processors or microprocessors. However, such implementations usually lack a cycle-by-cycle overcurrent protection loop, enabling an overcurrent condition to exist for an unacceptably long period of time, which can damage equipment. Analog or hybrid analog/digital designs typically require the use of two separate analog multipliers associated with respective phases of the AC waveform, each of which introduces errors into their product by different amounts, which tends to introduce a DC offset current to the output AC waveform, requiring additional compensation circuitry which can increase the complexity and cost of supplying power to the grid.

SUMMARY OF THE INVENTION

In accordance with one aspect of the invention there is provided a method of supplying high power factor electrical power to a load from an inverter having first and second switching legs connected to a first common output of the inverter and to first and second DC bus terminals of the inverter respectively, and third and fourth switching legs connected to a second common output of the inverter and to the first and second DC bus terminals respectively. The method involves producing a scaled rectified voltage signal in response to a rectified output voltage signal representing rectified instantaneous output voltage of the inverter, a power signal representing power associated with the output voltage of the inverter and a reference power signal, such that the scaled rectified voltage signal is a scaled version of the rectified output voltage signal. The method further involves producing a pulse width modulation (PWM) signal in response to the scaled rectified voltage signal and a rectified output current signal representing output current of the inverter and involves controlling the first, second, third and fourth switching legs in response to the PWM signal and a sign signal representing a sign of the instantaneous output voltage of the inverter.

The method may involve receiving the rectified output voltage signal.

The method may involve sensing instantaneous output voltage of the inverter and producing the rectified output voltage signal in response to the instantaneous output voltage.

The method may involve receiving the power signal.

The method may involve producing the power signal by applying a function to a signal representing the output voltage of the inverter.

The method may involve producing an average signal representing average amplitude of a rectified instantaneous output voltage of the inverter.

The method may involve receiving the reference power signal.

Producing the scaled rectified output voltage signal may involve multiplying the rectified output voltage signal by the ratio of the reference power signal to the power signal.

The method may involve receiving the rectified output current signal.

The method may involve sensing an output current of the inverter and producing the rectified output current signal in response to the output current.

The method may involve producing a compensation control signal in response to the rectified output current signal and the scaled rectified output voltage signal. Producing the compensation control signal may involve performing a proportional-integral function on the difference between the scaled rectified voltage signal and the rectified output current signal. Producing the PWM signal may involve producing a voltage pulse having a pulse width dependent upon the compensation control signal.

The method may involve stopping generation of the PWM signal when the instantaneous output current exceeds a reference value.

The method may involve receiving the sign signal.

The method may involve producing the sign signal such that the sign signal has a first state when the instantaneous output voltage of the inverter is positive and such that the sign signal has a second state when the instantaneous output voltage of the inverter is negative.

Controlling the first, second, third and fourth switching legs may involve shutting off the first and fourth switching legs and controlling an on-state of at least one of the second switching leg and the third switching leg in response to the PWM signal to modulate current through a conduction path comprised of the second and third switching legs when the sign signal indicates a positive instantaneous output voltage and by shutting off the second and third switching legs and controlling an on-state of at least one of the first switching leg and the fourth switching leg in response to the PWM signal to modulate current through a conduction path comprised of the first and fourth switching legs when the sign signal indicates a negative instantaneous output voltage.

In accordance with another aspect of the invention, there is provided an apparatus for supplying high power factor electrical power to a load from an inverter having first and second switching legs connected to a first common output of the inverter and first and second DC terminals of the inverter respectively, and third and fourth switching legs connected to a second common output of the inverter and the first and second DC terminals respectively. The apparatus includes a scaled rectified voltage signal generator configured to produce a scaled rectified voltage signal in response to a rectified output voltage signal representing rectified instantaneous output voltage of the inverter, a power signal representing power associated with the output voltage of the inverter and a reference power signal, such that the scaled rectified voltage signal is a scaled version of the rectified output voltage signal. The apparatus further Includes a pulse width modulation (PWM) signal generator configured to produce a pulse width modulation signal in response to the scaled rectified voltage signal and a rectified output current signal representing output current of the inverter and the apparatus further includes a switching leg controller circuit configured to control the first, second, third and fourth switching legs in response to the PWM signal and a sign signal representing a sign of the instantaneous output voltage of the inverter.

The apparatus may include a sensor configured to sense instantaneous output voltage of the inverter and a rectification circuit configured to produce the rectified output voltage signal in response to the instantaneous output voltage.

The apparatus may include a function circuit configured to perform a function on a signal representing the output voltage of the inverter. The function circuit may be configured to produce an average signal representing average amplitude of the rectified instantaneous output voltage of the inverter.

The scaled rectified voltage signal generator may include a multiplier configured to multiply the rectified output voltage signal by the ratio of the reference power level signal to the power signal.

The apparatus may include an output current sensor configured for sensing an output current of the inverter to produce an instantaneous output current signal and a rectifier circuit configured to produce the rectified output current signal in response to the instantaneous output current signal.

The apparatus may include a compensation signal generator for producing a compensation signal in response to the scaled rectified voltage signal and the rectified output current signal. The compensation signal generator may include a proportional-integral circuit having an output for providing the compensation signal as a proportional-integral function of the difference between the scaled rectified voltage and the rectified output current signal.

The PWM signal generator may be configured to produce a voltage pulse having a pulse width dependent upon the compensation signal.

The scaled rectified output voltage signal generator and the PWM signal generator may be contained within a single common integrated circuit.

The PWM signal generator may be configured to stop producing the PWM signal when the instantaneous output current exceeds a reference value.

The apparatus may include a signum circuit configured to produce the sign signal in response to the instantaneous output voltage such that the sign signal has a first state when the instantaneous output voltage is positive and such that the sign signal has a second state when the instantaneous output voltage is negative.

The switching leg controller circuit may be configured to shut off the first and fourth switching legs and to control an on-state of at least one of the second switching leg and the third switching leg in response to the PWM signal to modulate current through a conduction path comprised of the second and third switching legs when the sign signal indicates a positive instantaneous output voltage and to shut off the second and third switching legs and to control an on-state of at least one of the first switching leg and the fourth switching leg in response to the PWM signal to modulate current through a conduction path comprised of the first and fourth switching legs when the sign signal indicates a negative instantaneous output voltage.

The apparatus may include first, second, third and fourth gate drive circuits in communication with the first, second, third and fourth switching legs respectively and the switching leg controller circuit may include a logic circuit operable to receive the PWM signal and the sign signal and the apparatus may include first, second, third and fourth gate drive outputs in communication with the first, second, third and fourth gate drive circuits respectively.

In accordance with a another aspect of the invention there is provided an inverter operable to supply high power factor electrical power to an AC load including an AC power grid. The inverter includes a DC bus having first and second DC terminals operable to be supplied with power from a DC source, a DC to AC converter section having first and second switching legs connected to a first common AC output and the first and second DC terminals respectively and third and fourth switching legs connected to a second common output of the inverter and the first and second DC terminals respectively. The inverter further includes a voltage sensor configured to produce an instantaneous output voltage signal representing instantaneous output voltage of the inverter, a rectification circuit configured to produce a rectified output voltage signal in response to the instantaneous output voltage, a power signal generator for generating a power signal representing power associated with the instantaneous output voltage, an output current sensor configured for sensing an output current of the inverter to produce an instantaneous output current signal, a rectification circuit configured to produce the rectified output current signal in response to the instantaneous output current signal and a sign circuit for producing a signal representing the sign of the output voltage. The inverter further includes a control apparatus including a scaled rectified voltage signal generator configured to produce a scaled rectified voltage signal in response to the rectified output voltage signal, the power signal and a reference power signal, such that the scaled rectified voltage signal is a scaled version of the rectified output voltage signal. The control apparatus further includes a pulse width modulation (PWM) signal generator configured to produce a pulse width modulation signal in response to the scaled rectified voltage signal and the rectified output current signal and the control apparatus further includes a switching leg controller circuit configured to control the first, second, third and fourth switching legs in response to the PWM signal and the sign signal.

The switching leg controller circuit may be configured to shut off the first and fourth switching legs and to control an on-state of at least one of the second switching leg and the third switching leg in response to the PWM signal to modulate current through a conduction path comprised of the second and third switching legs when the sign signal indicates a positive instantaneous output voltage and to shut off the second and third switching legs and to control an on-state of at least one of the first switching leg and the fourth switching leg in response to the PWM signal to modulate current through a conduction path comprised of the first and fourth switching legs when the sign signal indicates a negative instantaneous output voltage.

The inverter may include first, second, third and fourth gate drive circuits in communication with the first, second, third and fourth switching elements respectively and the switching leg controller circuit may include a logic circuit operable to receive the PWM signal and the sign signal and may have first, second, third and fourth gate drive outputs in communication with the first, second, third and fourth gate drive circuits respectively.

The scaled rectified voltage signal generator and the PWM signal generator may include a common integrated circuit.

In accordance with another aspect of the invention there is provided an inverter operable to supply high power factor electrical power to an AC load including an AC power grid. The inverter includes a DC bus having first and second DC terminals operable to be supplied with power from a DC source, a DC to AC converter section having first and second switching legs connected to a first common AC output and the first and second DC terminals respectively and third and fourth switching legs connected to a second common output of the inverter and the first and second DC terminals respectively. The inverter further comprises provisions for producing a rectified output voltage signal representing rectified output voltage of the inverter, provisions for generating a power signal representing power associated with an instantaneous output voltage of the inverter, provisions for producing a rectified output current signal representing instantaneous output current of the inverter, and provisions for producing a sign signal representing the sign of the output voltage. The inverter further includes a control apparatus including provisions for producing a scaled rectified voltage signal in response to the rectified output voltage signal, the power signal and a reference power signal, such that the scaled rectified voltage signal is a scaled version of the rectified output voltage signal, provisions for producing a pulse width modulation signal in response to the scaled rectified voltage signal and the rectified output current signal and provisions for controlling the first, second, third and fourth switching legs in response to the PWM signal and the sign signal.

The provisions for controlling the first, second, third and fourth switching legs may be configured to shut off the first and fourth switching legs and to control an on-state of at least one of the second switching leg and the third switching leg in response to the PWM signal to modulate current through a conduction path comprised of the second and third switching legs when the sign signal indicates a positive instantaneous output voltage and to shut off the second and third switching legs and to control an on-state of at least one of the first switching leg and the fourth switching leg in response to the PWM signal to modulate current through a conduction path comprised of the first and fourth switching legs when the sign signal indicates a negative instantaneous output voltage.

The inverter may include first, second, third and fourth gate drive circuits in communication with the first, second, third and fourth switching legs respectively and the provisions for controlling the first, second, third and fourth switching legs may include a logic circuit operable to receive the PWM signal and the sign signal and may have first, second, third and fourth gate drive outputs in communication with the first, second, third and fourth gate drive circuits respectively.

The provisions for producing the scaled rectified voltage signal and the provisions for producing a PWM signal may include a common integrated circuit.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
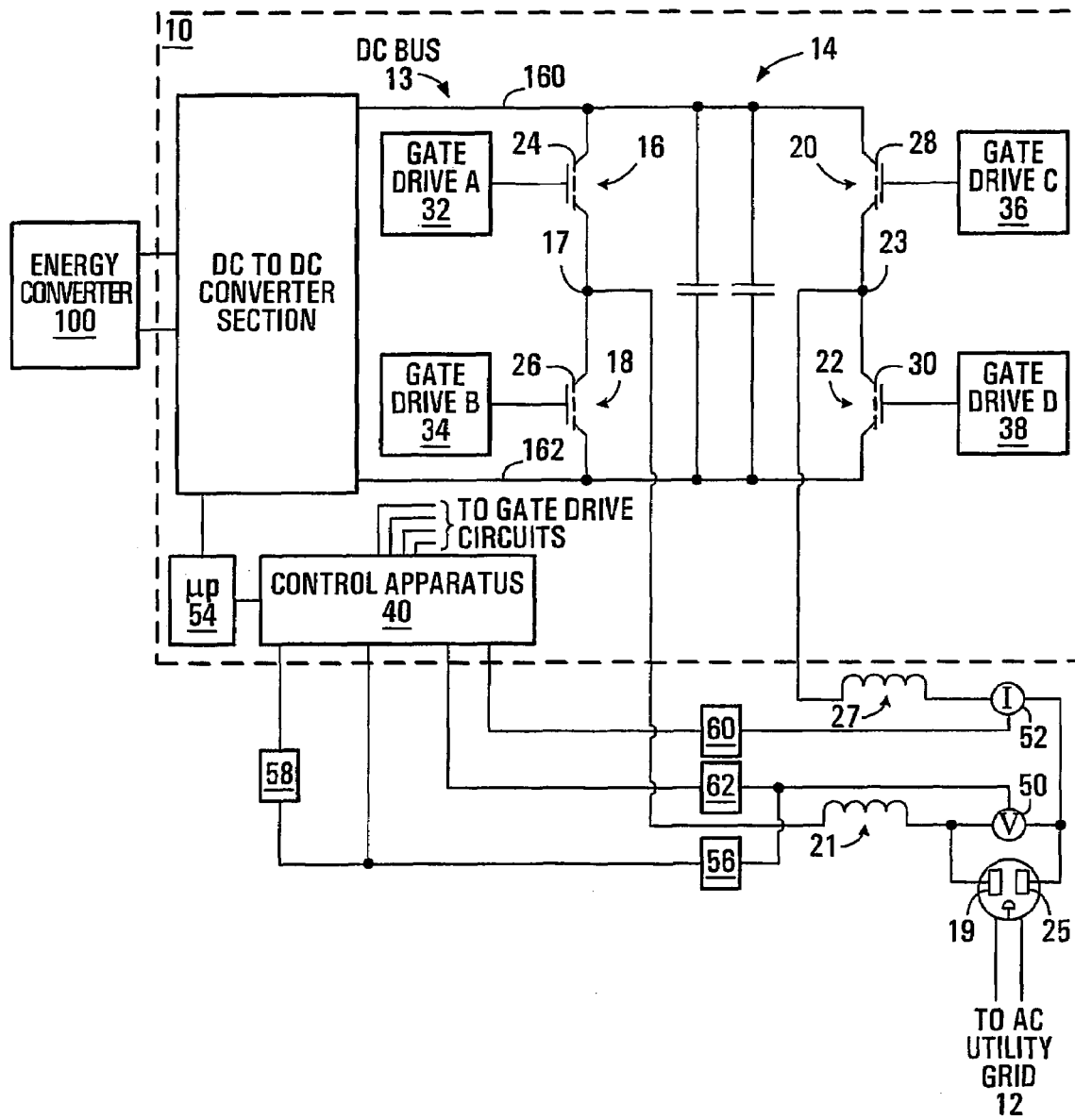
FIG. 1 is a schematic diagram of an inverter comprising an apparatus for controlling switching legs of the switching circuit thereof, in accordance with a first embodiment of the invention.

Referring to FIG. 1, an inverter configured to supply power to a load at a high power factor is shown generally at 10. The load may include an AC utility grid 12. In the embodiment shown, the inverter 10 supplies power to the grid 12 at substantially unity power factor.

The inverter 10 includes a DC bus 13 supplied with energy from a DC source. The DC bus has first and second terminals including a positive terminal 160 and a negative terminal 162. The inverter also includes a full bridge-type DC to AC converter section 14 having first, second, third and fourth switching legs 16, 18, 20 and 22 connected to the first and second terminals 160 and 162 of the DC bus as shown. Each switching leg 16, 18, 20 and 22 may include one or more switches, which, in the embodiment shown, include respective metallic oxide semiconductor field effect transistors (MOSFETs) 24, 26, 28 and 30.

The first and second switching legs 16 and 18 are connected together at a first node 17 that is connected to a first common AC output 19 through a first inductor 21. The third and fourth switching legs are connected together at a second node 23 that is connected to a second common AC output 25 through a second inductor 27.

Each leg 16, 18, 20 and 22 includes a respective gate drive circuit 32, 34, 36, 38 optically isolated from a control apparatus 40. The gate drive circuits 32, 34, 36 and 38 are configured to turn their respective switching legs on and off in response to respective gate drive signals received from the control apparatus 40.

Figure 2:
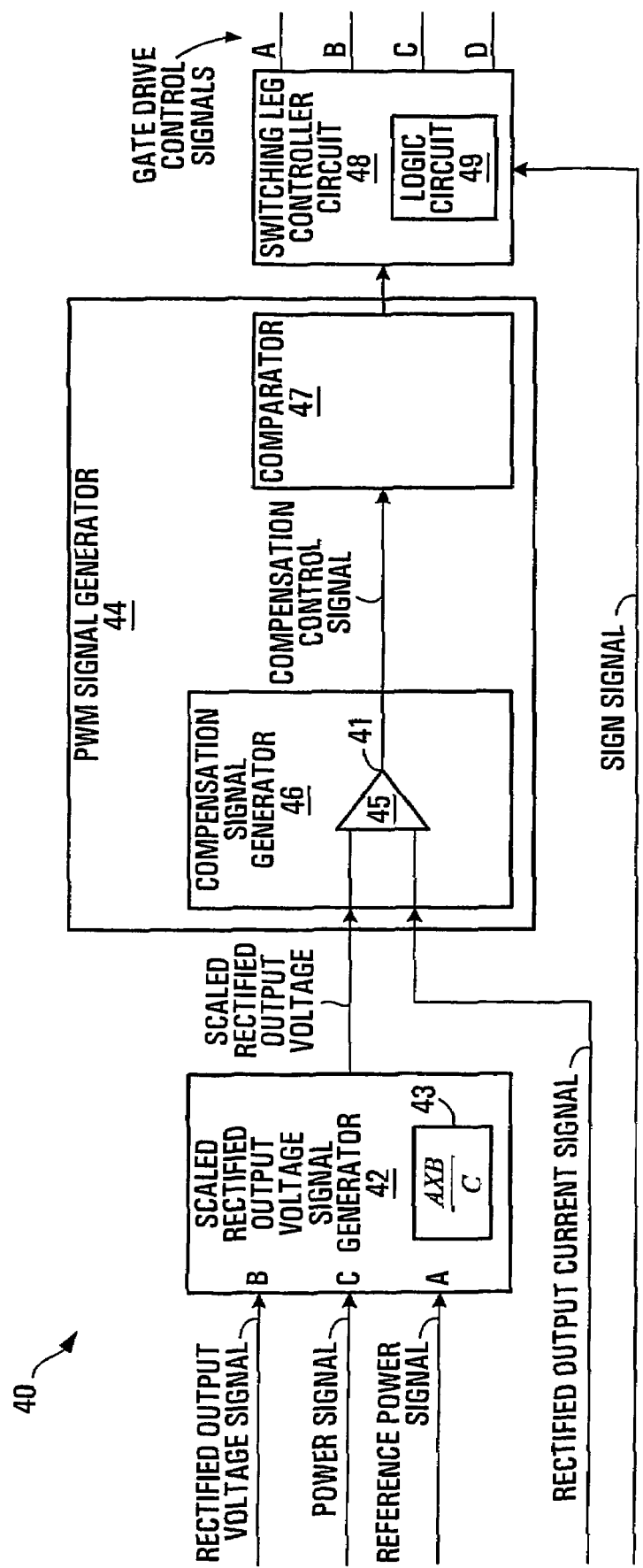
FIG. 2 is a block diagram illustrating functional blocks of a control apparatus of the circuit shown in FIG. 1.

Referring to FIG. 2, in the embodiment shown, the control apparatus 40 includes a scaled rectified voltage signal generator 42 for producing a scaled rectified output voltage signal in response to a rectified output voltage signal representing rectified instantaneous output voltage of the inverter 10, a power signal representing power associated with the output voltage of the inverter and a reference power signal, such that the scaled rectified voltage signal is a scaled version of the rectified output voltage signal. The control apparatus 40 also includes a PWM signal generator 44 for producing a pulse-width modulation (PWM) signal in response to the scaled rectified voltage signal and a rectified output current signal representing output current of the inverter 10. The control apparatus 40 further includes a switching leg controller circuit 48 for controlling the switching legs 16, 18, 20 and 22 in response to the PWM signal and a sign signal representing a sign of the instantaneous output voltage of the inverter 10.

In the embodiment shown, the scaled rectified output voltage signal generator 42 includes a multiplier 43 configured to receive the rectified output voltage signal, the power signal and the reference power signal, and to multiply the rectified output voltage signal by a ratio of the reference power signal to the power signal to produce the scaled rectified voltage signal such that the scaled rectified voltage signal is a scaled version of the rectified output voltage signal.

The PWM signal generator 44 includes a compensation signal generator 46 for producing a compensation signal in response to the scaled rectified voltage signal and the rectified output current signal. The compensation signal generator includes a proportional-integral function circuit 45 configured to set an output 41 to a voltage level by applying a proportional-integral function to an error signal determined as the difference between the scaled rectified voltage signal amplitude and the amplitude of the rectified output current signal.

The PWM signal generator 44 further includes a comparator 47 configured to compare the compensation signal with the amplitude of a sawtooth waveform produced by an oscillator (not shown) in the PWM signal generator, the oscillator having a frequency of about 30 kHz. When the compensation signal amplitude is greater than the sawtooth waveform amplitude, the output of the comparator 47 is set high and when the compensation signal amplitude is less than the sawtooth waveform amplitude, the output of the comparator is set low. The output of the comparator 47 is thus a PWM signal comprising voltage pulses at a frequency of about 30 kHZ, with a pulse width dependent upon the amplitude of the compensation signal relative to the amplitude of the sawtooth waveform.

The switching leg controller circuit 48 includes a logic circuit 49 operable to receive the PWM signal and the sign signal and has first, second, third and fourth gate drive outputs A, B, C, D in communication with the gate drive circuits 32, 34, 36 and 38, respectively. The switching leg controller logic circuit 49 is configured to shut off the first and fourth switching legs (16 and 22) of the converter section 14 and to control an on-state of at least one of the second switching leg (18) and the third switching leg (20) of the converter section 14 in response to the PWM signal to modulate current through a conduction path comprised of the second and third switching legs, when the sign signal indicates a positive instantaneous output voltage. The switching leg controller logic circuit 49 is also configured to shut off the second and third legs 18 and 20 of the converter section 14 and control an on-state of at least one of the first switching leg 16 and the fourth switching leg 22 of the converter section 14 in response to the PWM signal to modulate current through a conduction path comprised of the first and fourth switching legs 16 and 22, when the sign signal indicates a negative instantaneous output voltage.

Referring back to FIG. 1, to facilitate such control, the inverter 10 or control apparatus 40 may further include ancillary circuits including a voltage sensing circuit 50 for sensing instantaneous output voltage of the inverter 10, to produce a signal representing the instantaneous output voltage of the inverter, a current sensing circuit 52 for sensing instantaneous output current of the inverter to produce a signal representing instantaneous output current of the inverter, and a reference power signal generator circuit 54 for generating the reference power signal. The ancillary circuits may further include a rectified output voltage signal generator circuit 56 for producing the rectified output voltage signal representing rectified output voltage of the inverter in response to the instantaneous output voltage, a circuit 58 for producing the power signal in response to the rectified output voltage signal, a circuit 60 for producing a rectified instantaneous current signal in response to the instantaneous current signal and a circuit 62 for producing the sign signal in response to the instantaneous output voltage signal. The above ancillary circuits may be implemented in a variety of different ways. Some of which are exemplified below. In general, it is desirable to design the ancillary circuits such that the effect occurring in a signal produced by any ancillary circuit occurs instantaneously in response to a change in voltage or current, or such that the effect occurs after only a very small delay time, in order to be able to obtain power factors within a few hundredths of a percent of unity power factor. In effect the greater the delay caused by these ancillary circuits the less likely it will be to achieve near unity power factors.

Figure 3:
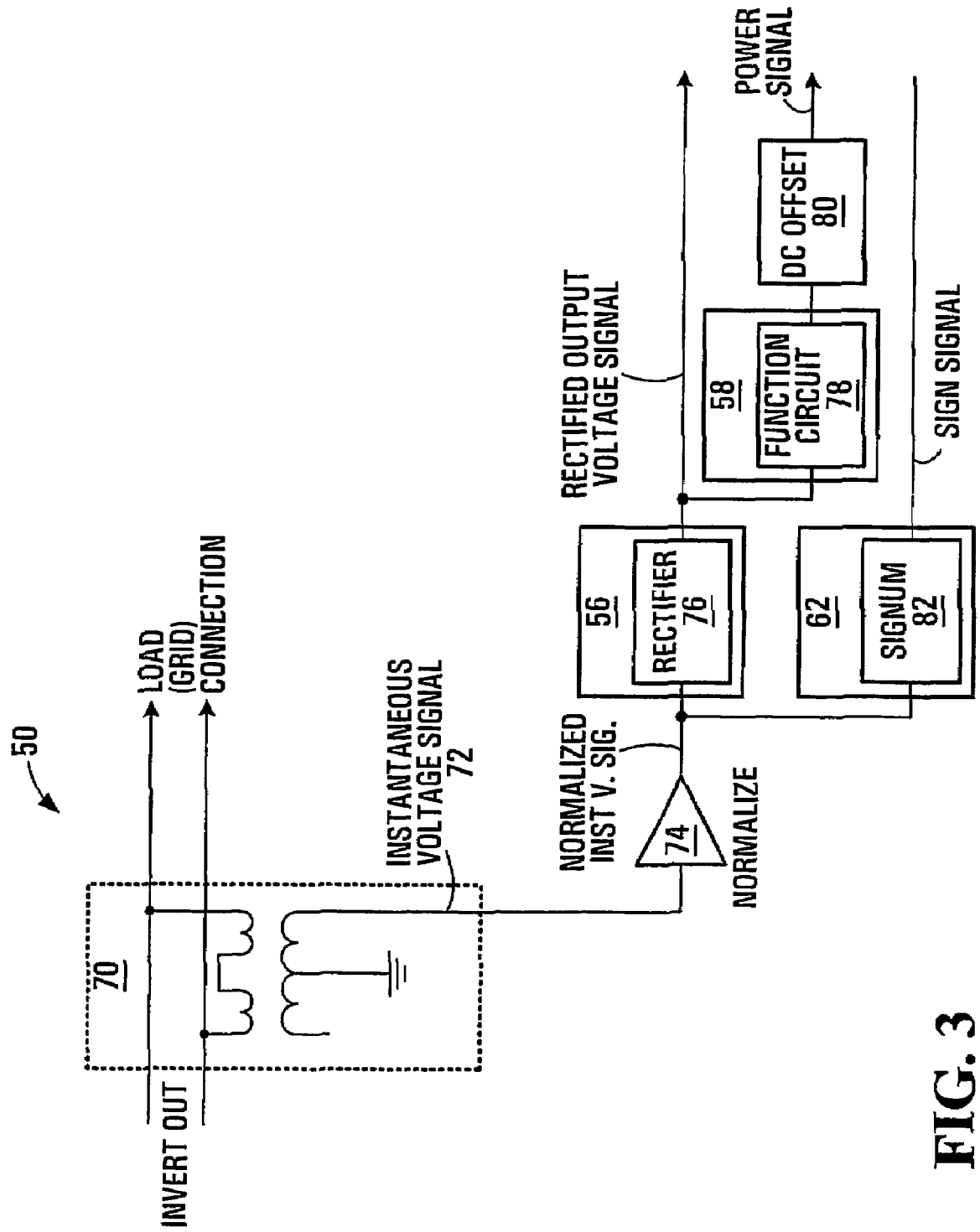
FIG. 3 is a block diagram of ancillary voltage sensing circuits shown in FIG. 1.

Referring to FIG. 3, an exemplary voltage sensing circuit 50 for sensing instantaneous output voltage of the inverter 10 is shown. The circuit 50 includes a potential transformer 70 which acts as a voltage sensor for sensing the output voltage of the inverter 10. The potential transformer 70 has an output 72 at which it produces an instantaneous voltage signal that follows the output voltage of the inverter 10 in phase and amplitude. This instantaneous voltage signal is then normalized by a normalization circuit 74 to produce a normalized instantaneous voltage signal. The circuit 56 for producing the rectified output voltage signal includes a rectifier circuit 76 operable to rectify the normalized instantaneous voltage signal produced by the normalization circuit 74. The rectified output voltage signal is generally comprised of a contiguous series of pure positive half-cycles of an AC sine wave.

In the embodiment shown, the circuit 58 for producing the power signal in response to the rectified output voltage signal, includes a function circuit 78 for performing a function on a signal representing the output voltage of the inverter 10. In the embodiment shown, the function circuit derives a power level from the rectified output voltage signal. The function may be an average function, or a root mean square (RMS) function, for example. In the embodiment shown, the function circuit 78 includes a Sallen-key, fourth order Bessel analog filter having a cutoff frequency of about 20 Hz. The rectified output voltage signal produced by the rectifier circuit 76 is received at the function circuit 78 which produces an average signal having a voltage amplitude proportional to the root mean square of the rectified output voltage signal. The average signal is applied to a DC offset circuit 80 which inverts and adds a common mode voltage to the average signal to produce the power signal such that power signal is inversely proportional to the average value of the output voltage of the inverter 10.

As will be understood with further reading herein, when supplying power to a relatively stiff grid, such as the North American utility grid, the power signal is relatively constant since grid voltage is held relatively constant by the voltage inflexibility of such a robust grid. When supplying power to a relatively weak grid or to a simple load, or where the grid fails, the power signal can fluctuate. If the output voltage should increase, the power signal amplitude decreases, resulting in an increase in current supplied by the inverter. The increase in output current of the inverter 10 results in a further increase in output voltage. As output voltage continues to increase, eventually the current demanded from the inverter will exceed threshold values causing supervisory circuits (not shown) to shut down the inverter. If the output voltage should decrease, the power signal amplitude increases, resulting in a decrease in current supplied by the inverter. Reduced output current results in reduced output voltage until an undervoltage condition exists in which case the supervisory circuits will shut down the inverter 10.

In the embodiment shown, the circuit 62 for producing the sign signal includes a signum circuit 82 comprised of a zero crossing detector operable to receive the normalized instantaneous output voltage signal from the normalization circuit 74. The zero crossing detector produces the sign signal such that it has a first state, e.g. digital 1, when the output voltage is in its positive half cycle, and a second state, e.g. digital 0, when the output voltage is in its negative half cycle. The first state indicates the output voltage of the inverter 10 has a positive sign and the second state indicates the output voltage of the inverter 10 has a negative sign, thus, the sign signal represents a sign of the instantaneous output voltage signal.

Figure 4:
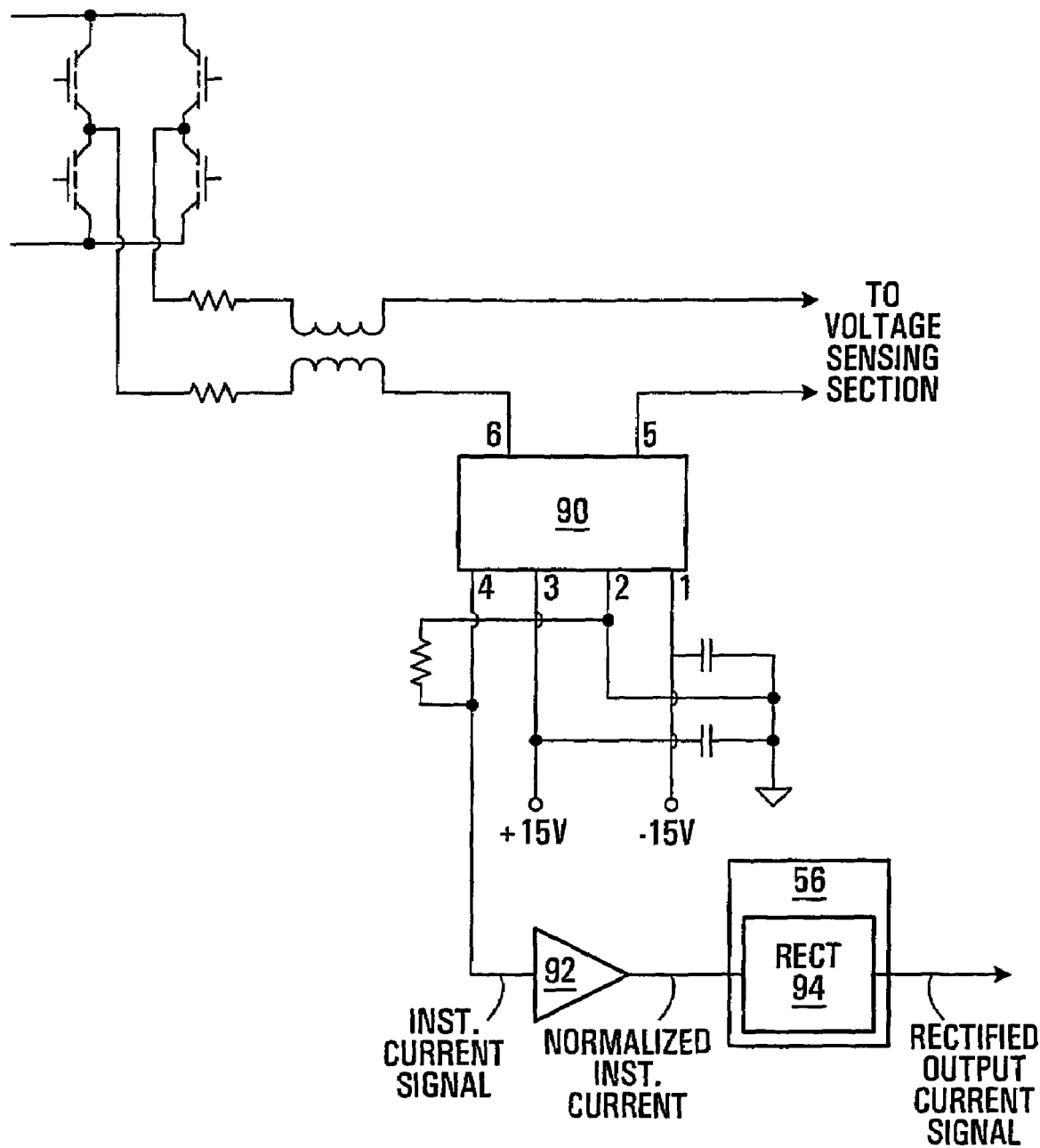
FIG. 4 is a block diagram of ancillary current sensing circuits shown in FIG. 1.

Referring to FIG. 4, in the embodiment shown, the current sensing circuit 52 for sensing instantaneous output current of the inverter, includes a current sensor 90 which in this embodiment is provided by a Hall Effect sensor such as an HX 15-P available from LEM USA, Inc. of Milwaukee, Wis., USA. The current sensor 90 produces an instantaneous current signal that follows the amplitude and phase of the current supplied by the inverter 10. This instantaneous current signal is normalized by a normalization circuit 92 to produce a normalized instantaneous current signal. The circuit 56 for producing a rectified instantaneous current signal includes a rectifier 94 operable to rectify the normalized instantaneous current signal to produce the rectified current output signal. The rectified current output signal is generally comprised of a contiguous series of pure positive half-cycles of an AC sine wave representing the current supplied to the load and generally has the same waveform shape as the rectified output voltage signal.

Referring back to FIG. 1, in the embodiment shown, the reference power signal generator circuit 54 produces the reference power signal such that it has a voltage responsive to a power demand signal that may be supplied by or produced in response to the operating conditions of an energy converter depicted at 100 in FIG. 1, driving the inverter 10. The energy converter 100 may include a photovoltaic array, for example. The photovoltaic array may have its own control circuit or a related control circuit (not shown) that determines an optimum output power level (e.g., MPPT) for the array based on conversion efficiency, for example, and this control circuit may provide the power demand signal used by the reference power signal generator circuit 54 to produce the reference power signal. In the embodiment shown, the reference power signal has an amplitude that represents the power available from the energy converter 100.

Figures 5, 6:
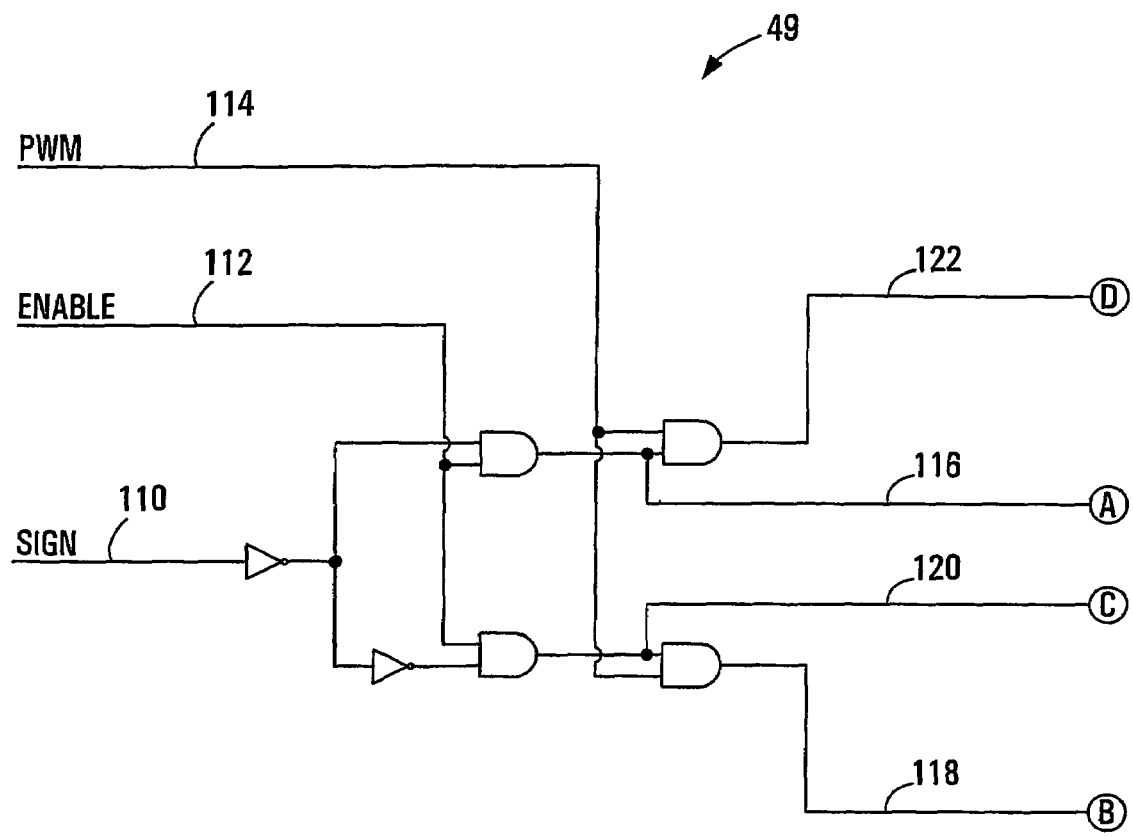
FIG. 5 is a logic diagram illustrating a logic circuit shown in FIG. 2.
FIG. 6 is a truth table for the logic diagram shown in FIG. 5.

Referring to FIG. 5, the switching leg controller logic circuit 49 includes a basic combinatorial logic circuit comprising inverters, and AND gates configured as shown to implement the functionality of the truth table shown in FIG. 6. In general, any logic circuit capable of implementing the truth table shown in FIG. 6 may be used. Referring to FIGS. 5 and 6, in the embodiment shown, the logic circuit 49 has sign, enable and PWM inputs 110, 112 and 114 and has first, second, third and fourth outputs 116, 118, 120, and 122. The sign input 110 receives the sign signal produced by the signum circuit 82 shown in FIG. 3. The enable input 112 is operable to receive an enable signal produced by a processor (not shown), for example in the inverter 10. The enable signal may be produced by the processor or a supervisory circuit in the inverter 10 to shut off all activity in the switching legs 16, 18, 20 and 22 upon detecting an error condition, such as an overvoltage or overcurrent condition, for example. The PWM input 114 receives the PWM signal produced by the PWM signal generator 44. The first, second, third, and fourth outputs 116, 118, 120 and 122 are in communication with the gate drive circuits 32, 34, 36, and 38 associated with switching legs 16, 18, 20 and 22 respectively labeled A, B, C, and D. Effectively, the state of the sign signal causes the logic circuit 49 to divert the PWM signal to either the fourth gate drive circuit 38 (D) or to the second gate drive circuit 34 (B) while causing the remaining gate drives to be turned off or on, as shown in the truth table of FIG. 6. Instead of diverting the PWM signal to the second or fourth gate drive circuits 34 or 38, while the third or first switching legs 16 and 20 respectively are on, the PWM signal may be diverted to the third or first gate drive circuits 36 or 32 while the second or fourth switching legs 18 or 22 respectively are turned on. Or both legs of a pair of switching legs may be controlled by the PWM signal while the other pair is turned off and vice versa. Thus, during each half cycle of an AC output voltage waveform of the inverter 10, an associated pair of switching legs is activated with at least one switching leg of the pair being pulsed on and off according to the PWM signal while the other switching leg of the pair is maintained in an on state and the switching legs of the remaining pair are turned off.

Referring back to FIG. 2, the width of the pulses of the PWM signal is controlled according to a comparison of the scaled rectified output voltage signal with the rectified output current signal such that differences in phase or magnitude in these signals cause the PWM signal generator to adjust the width of the pulses of the PWM signal issued during the current half-cycle of output voltage to cause greater or lesser current to be drawn from the DC bus 13 such that these differences are maintained at or very near zero at every instant in time of the output voltage waveform. Since average values for half-cycles of the output voltage waveform are determined on a half-cycle basis and since it takes a half cycle to acquire an average value for use in a following half cycle, the above-described circuits perform cycle by cycle power factor control of the voltage and current waveforms produced by the inverter 10. Thus, on a cycle by cycle basis the output voltage and output current of the inverter follow each other, in phase, resulting in power being supplied at near unity power factor.

One efficient and convenient way in which the control apparatus 40 can be implemented involves the use of a conventional preregulator circuit with the switching leg controller logic circuit 49 shown in FIG. 5. The preregulator circuit may include an Advanced High Power Factor Preregulator such as that produced by Texas Instruments Incorporated of Dallas Tex. under model Number UC3854BDW, or under other model numbers of devices within the same family of components, for example. The preregulator circuit is configured to produce the scaled rectified voltage signal in response to the rectified output voltage signal, the power signal and the reference power signal and produces the compensation signal in response to the scaled rectified voltage signal and the rectified output current signal and produces the PWM signal in response to the compensation signal. The preregulator circuit thus provides the functions of the scaled rectified output voltage signal generator 42, the PWM signal generator 44 and the compensation signal generator 46 all in one common integrated circuit. The logic circuit 49 described above in connection with FIGS. 5 and 6 is still used to control the switching legs 16, 18, 20 and 22 in response to the PWM signal produced by the preregulator circuit and in response to the sign signal as described above.

Figure 7:
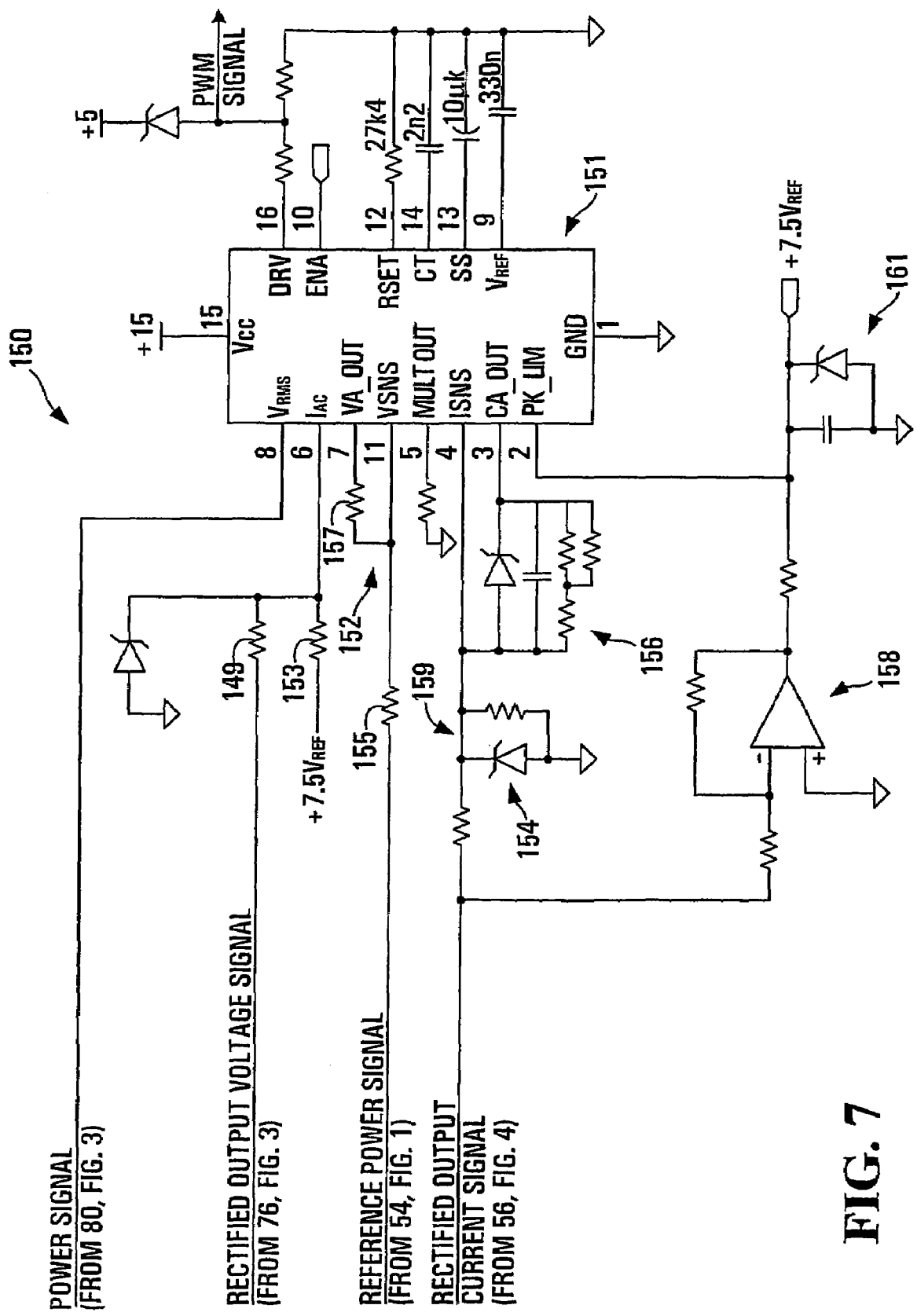
FIG. 7 is a schematic diagram showing an implementation of the control apparatus of FIG. 1, according to a second embodiment of the invention.

The use of the preregulator circuit is exemplified by the preregulator circuit shown generally at 150 in FIG. 7. It is to be understood that the ancillary circuits described and shown in connection with FIGS. 3 and 4 may be used to produce the rectified output voltage signal, power signal, sign signal and rectified current output signal for use by the preregulator circuit 150 shown in FIG. 7. In addition the same reference power signal generator circuit 54 may also be used to produce the reference power signal used by the preregulator circuit 150.

Referring to FIG. 7, the preregulator circuit 150 includes an integrated circuit (IC) 151 having pins 1-16, the functions of which are set forth in a data sheet published by Texas Instruments Incorporated. This data sheet is incorporated herein by reference. The integrated circuit 151 sold under the model number above is conventionally used for power factor correction in devices drawing power from an AC source however, it has been found that by suitable connection of components to various pins of the IC and by supplying it with the particular signals indicated, in the manner indicated, the IC may be used, as described, in the inverter 10 to supply power to a load, particularly an AC grid, instead of its conventional use in controlling the draw of power from an AC source such as an AC grid.

In general, all of the ancillary circuits and other circuits that supply signals to the preregulator circuit 150 are designed to ensure that voltages and currents supplied to the preregulator circuit are within limits specified by the manufacturer.

In the embodiment shown, the power signal produced by the DC offset circuit 80 shown in FIG. 3 is supplied directly to a $V_{RMS}$ input at pin 8 of the IC 151. The rectified output voltage signal produced by the rectified output voltage signal generator circuit 56 shown in FIG. 3 is supplied to an $I_{AC}$ input at pin 6 of the IC, through a resistor 149 which acts to convert the voltage of the rectified output voltage signal into a current value for receipt at pin 6, which is a current input. A further resistor 153 connected to a reference voltage serves to reduce distortion at the zero crossing point of current at pin 6. The reference power signal produced by the reference power signal generator circuit 54 shown in FIG. 1 may be a signal having a voltage of between 3V and 5V, for example, which is decreased by the resistor network shown at 152. The reference power signal is supplied to a $V_{SNS}$ input at pin 11 through a resistor 155 and to a VA_OUT output at pin 7, through a resistor 157. Resistors 155 and 157 set the gain of a differential amplifier in the IC. The MULTI_OUT output at pin 5 is resistor-terminated to ground to convert a current signal from a multiplier inside the IC into a voltage signal. The rectified current output signal produced by the rectified current output signal generator circuit 56 shown in FIG. 4, is supplied through a resistor divider 159 to a current sense input at pin 4. The amplitude of this signal is limited by a zener diode limiter 154. A network 156 is connected between the current sense input at pin 4 and a current amplifier output at pin 3, to set gain dynamics of the compensation signal generator 46 implemented by the IC, to set operating parameters of the proportional-integral function provided by the compensation signal generator. An inverting circuit 158 is connected to receive the rectified current signal and to provide an inverted version of that signal to a peak limit input at pin 2 of the IC. Pin 2 is also protected by an amplitude limiting circuit 161 and is provided with a 7.5 Volt reference voltage. The output of the inverting circuit 158 is effectively subtracted from the 7.5V reference and when the resulting signal goes below zero, signifying an overcurrent condition, the IC causes production of the PWM signal at pin 16 to be stopped to remove the overcurrent condition. Thus, the generation of the PWM signal is stopped when the instantaneous output current exceeds a reference value. Pins 9, 12, 13 and 14 of the IC are connected to a resistor and capacitor network that defines the operating frequency of an internal oscillator, ultimately defining the frequency of the pulses produced by the IC, at the gate drive output at pin 16. In the embodiment shown, a 27.4K resistor is connected to pin 12, a 2.2 nF capacitor is connected to pin 14, a 10 uF capacitor is connected to pin 13 and a 330 nF capacitor is connected to pin 9 to produce a pulse frequency of about 30 kHz.

The PWM signal produced at pin 16 is provided to the PWM input 114 of the logic circuit shown in FIG. 5 and the logic circuit produces gate control signals at outputs 116, 118, 120 and 122, respectively, to cause the first and fourth switching legs 16 and 22 shown in FIG. 1 to be shut off while the on-state of the second switching leg 18 is controlled by the PWM signal and the third switching leg 20 is on, when the sign signal indicates a positive instantaneous output voltage and to cause the second and third switching legs 18 and 20 to be shut off while the on-state of the fourth switching leg 22 is controlled by the PWM signal and the first switching leg 16 is on, when the sign signal indicates a negative instantaneous output voltage. The width of the pulses in the PWM signal is controlled such that the current provided to the first and second common AC outputs 19 and 25 is in-phase with the voltage at the AC outputs 19 and 25. This control is provided by the compensation control signal produced by the compensation control signal generator which provides the proportion-integral function applied to the error signal representing the difference in amplitude between the scaled rectified output voltage signal and the rectified output current signal.

While specific embodiments of the invention have been described and illustrated, such embodiments should be considered illustrative of the invention only and not as limiting the invention as construed in accordance with the accompanying claims.

What is claimed is:

1. A method of supplying high power factor electrical power to a load from an inverter having first and second switching legs connected to a first common output of the inverter and to first and second DC bus terminals of the inverter, respectively, and third and fourth switching legs connected to a second common output of the inverter and to said first and second DC bus terminals, respectively, the method comprising:

producing a scaled rectified voltage signal in response to a rectified output voltage signal representing rectified instantaneous output voltage of the inverter, a power signal inversely proportional to an average amplitude of the rectified instantaneous output voltage of the inverter, and a reference power signal, wherein producing said scaled rectified output voltage signal comprises multiplying said rectified output voltage signal by a ratio of said reference power signal to said power signal, such that said scaled rectified voltage signal is a scaled version of said rectified output voltage signal that increases when said average amplitude of the rectified output voltage of the inverter increases, and decreases when said average amplitude of the rectified output voltage of the inverter decreases;

producing a pulse width modulation (PWM) signal in response to said scaled rectified voltage signal and a rectified output current signal representing output current of the inverter; and controlling said first, second, third and fourth switching legs in response to said PWM signal and a sign signal representing a sign of the instantaneous output voltage of the inverter, such that current supplied by the inverter increases when said average amplitude of the rectified output voltage of the inverter increases, and decreases when said average amplitude of the rectified output voltage of the inverter decreases.

2. The method of claim 1 further comprising receiving said rectified output voltage signal.

3. The method of claim 1 further comprising sensing instantaneous output voltage of the inverter and producing said rectified output voltage signal in response to said instantaneous output voltage.

4. The method of 1 further comprising receiving said power signal.

5. The method of claim 1 further comprising producing said power signal by applying a function to a signal representing the output voltage of the inverter.

6. The method of claim 5 wherein applying said function comprises producing an average signal representing said average amplitude of the rectified instantaneous output voltage of the inverter.

7. The method of claim 1 further comprising receiving said reference power signal.

8. The method of claim 1 further comprising receiving said rectified output current signal.

9. The method as claimed in claim 1 further comprising sensing an output current of the inverter and producing said rectified output current signal in response to said output current.

10. The method of claim 1 further comprising producing a compensation signal in response to said rectified output current signal and said scaled rectified output voltage signal.

11. The method of claim 10 wherein producing said compensation signal comprises performing a proportional-integral function on a difference between said scaled rectified voltage signal and said rectified output current signal.

12. The method of claim 11 wherein producing said PWM signal includes producing a voltage pulse having a pulse width dependent upon said compensation signal.

13. The method as claimed in claim 12 further comprising stopping generation of said PWM signal when said instantaneous output current exceeds a reference value.

14. The method as claimed in claim 1 further comprising receiving said sign signal.

15. The method as claimed in claim 1 further comprising producing said sign signal such that said sign signal has a first state when the instantaneous output voltage of the inverter is positive and such that said sign signal has a second state when the instantaneous output voltage of the inverter is negative.

16. The method as claimed in claim 1 wherein controlling said first, second third and fourth switching legs includes shutting off said first and fourth switching legs and controlling an on-state of at least one of said second switching leg and said third switching leg in response to said PWM signal to modulate current through a conduction path comprised of said second and third switching legs when said sign signal indicates a positive instantaneous output voltage and by shutting of f said second and third switching legs and controlling an on-state of at least one of said first switching leg and said fourth switching leg in response to said PWM signal to modulate current through a conduction path comprised of said first and fourth switching legs when said sign signal indicates a negative instantaneous output voltage.

17. An apparatus for supplying high power factor electrical power to a load from an inverter having first and second switching legs connected to a first common output of the inverter and first and second DC terminals of the inverter respectively, and third and fourth switching legs connected to a second common output of the inverter and said first and second DC terminals respectively, the apparatus comprising:
 means for producing a scaled rectified voltage signal in response to a rectified output voltage signal representing rectified instantaneous output voltage of the inverter, a power signal inversely proportional to an average amplitude of the rectified instantaneous output voltage of the inverter, and a reference power signal, wherein said means for producing said scaled rectified output voltage signal is configured to multiply said rectified output voltage signal by a ratio of said reference power signal to said power signal such that said scaled rectified voltage signal is a scaled version of said rectified output voltage signal that increases when said average amplitude of the rectified output voltage of the inverter increases, and decreases when said average amplitude of the rectified output voltage of the inverter decreases;
 means for producing a pulse width modulation (PWM) signal in response to said scaled rectified voltage signal and a rectified output current signal representing output current of the inverter; and
 means for controlling said first, second, third and fourth switching legs in response to said PWM signal and a sign signal representing a sign of said instantaneous output voltage of said inverter such that current supplied by the inverter increases when said average amplitude of the rectified output voltage of the inverter increases, and decreases when said average amplitude of the rectified output voltage of the inverter decreases.

18. The apparatus of claim 17 further comprising means for receiving said rectified output voltage signal.

19. The apparatus of claim 17 further comprising means for sensing instantaneous output voltage of the inverter and means for producing said rectified output voltage signal in response to said instantaneous output voltage.

20. The apparatus of claim 17 further comprising means for receiving a power signal representing power associated with said output voltage signal.

21. The apparatus of claim 17 further comprising means for producing said power signal by applying a function to a signal representing the output voltage of the inverter.

22. The apparatus of claim 21 wherein said means for producing said power signal is configured to produce an average signal representing said average amplitude of the rectified instantaneous output voltage of the inverter.

23. The apparatus of claim 17 further comprising means for receiving said reference power signal.

24. The apparatus of claim 17 further comprising means for receiving a rectified instantaneous supply current signal.

25. The apparatus of claim 17 further comprising means for sensing an output current of said inverter to produce an instantaneous output current signal and means for producing said rectified output current signal in response to said instantaneous output current signal.

26. The apparatus of claim 17 further comprising means for producing a compensation signal in response to said scaled rectified voltage signal and said rectified output current signal.

27. The apparatus of claim 26 wherein said means for producing a compensation signal comprises a proportional-integral circuit for providing said PWM control signal, in response to a difference between said scaled rectified voltage signal and said rectified output current signal.

28. The apparatus of claim 27 wherein said means for producing said PWM signal is configured to produce a voltage pulse having a pulse width dependent upon said compensation signal.

29. The apparatus of claim 28 further comprising means for causing said means for producing said PWM signal to stop producing said PWM signal when said instantaneous output current exceeds a reference value.

30. The apparatus of claim 17 further comprising means for receiving a sign signal representing a sign of said instantaneous output voltage of the inverter.

31. The apparatus of claim 17 further comprising means for producing said sign signal such that said sign signal has a first state when said instantaneous output voltage is positive and such that said sign signal has a second state when said instantaneous output voltage is negative.

32. The apparatus of claim 31 wherein said means for controlling said first, second third and fourth switching legs is configured to shut off said first and fourth switching legs and to control an on state of at least one of said second switching leg and said third switching leg in response to said PWM signal to modulate current through a conduction path comprised of said second and third switching legs when said sign signal indicates a positive instantaneous output voltage and to shut off said second and third switching legs and to control an on state of at least one of said first switching leg and said fourth switching leg in response to said PWM signal to modulate current through a conduction path comprised of said first and fourth switching legs, when said sign signal indicates a negative instantaneous output voltage.

33. The apparatus of claim 17 wherein said means for producing said scaled rectified voltage signal and the means for producing a pulse width modulation signal are contained within a single integrated circuit.

34. An apparatus for supplying high power factor electrical power to a load from an inverter having first and second switching legs connected to a first common output of the inverter and first and second DC terminals of the inverter respectively, and third and fourth switching legs connected to a second common output of the inverter and said first and second DC terminals respectively, the apparatus comprising:
  a scaled rectified voltage signal generator configured to produce a scaled rectified voltage signal in response to a rectified output voltage signal representing rectified instantaneous output voltage of the inverter, a power signal inversely proportional to an average amplitude of the rectified instantaneous output voltage of the inverter and a reference power signal, wherein said scaled rectified voltage signal generator includes a multiplier configured to multiply said rectified output voltage signal by a ratio of said reference power level signal to said power signal such that said scaled rectified voltage signal is a scaled version of said rectified output voltage signal that increases when said average amplitude of the rectified output voltage of the inverter increases, and decreases when said average amplitude of the rectified output voltage of the inverter decreases;
  a pulse width modulation (PWM) signal generator configured to produce a pulse width modulation signal in response to said scaled rectified voltage signal and a rectified output current signal representing output current of the inverter; and
  a switching leg controller circuit configured to control said first, second, third and fourth switching legs in response to said PWM signal and a sign signal representing a sign of said instantaneous output voltage of said inverter such that current supplied by the inverter increases when said average amplitude of the rectified output voltage of the inverter increases, and decreases when said average amplitude of the rectified output voltage of the inverter decreases.

35. The apparatus of claim 34 further comprising a sensor configured to sense instantaneous output voltage of the inverter and a rectification circuit configured to produce said rectified output voltage signal in response to said instantaneous output voltage.

36. The apparatus of claim 35 further comprising a function circuit configured to perform a function on a signal representing the output voltage of the inverter.

37. The apparatus of claim 36 wherein said function circuit is configured to produce an average signal representing said average amplitude of the rectified instantaneous output voltage of the inverter.

38. The apparatus of claim 34 further comprising an output current sensor configured for sensing an output current of the inverter to produce an instantaneous output current signal and a rectifier circuit configured to produce said rectified output current signal in response to said instantaneous output current signal.

39. The apparatus of claim 34 further comprising a compensation signal generator for producing a compensation signal in response to said scaled rectified voltage signal and said rectified output current signal.

40. The apparatus of claim 39 wherein said compensation signal generator comprises a proportional-integral circuit for providing said compensation signal, in response to a difference between said scaled rectified voltage signal and said rectified output current signal.

41. The apparatus of claim 40 wherein said PWM signal generator is configured to produce a voltage pulse having a pulse width dependent upon said compensation signal.

42. The apparatus of claim 34 wherein said scaled rectified output voltage signal generator and said PWM signal generator are contained within a single common integrated circuit.

43. The apparatus of claim 34 wherein said PWM signal generator is configured to stop producing said PWM signal when said instantaneous output current exceeds a reference value.

44. The apparatus of claim 34 further comprising a signum circuit configured to produce said sign signal in response to said instantaneous output voltage such that said sign signal has a first state when said instantaneous output voltage is positive and such that said sign signal has a second state when said instantaneous output voltage is negative.

45. The apparatus of claim 44 wherein said switching leg controller circuit is configured to shut off said first and fourth switching legs and to control an on-state of at least one of said second switching leg and said third switching leg in response to said PWM signal to modulate current through a conduction path comprised of said second and third switching legs when said sign signal indicates a positive instantaneous output voltage and to shut off said second and third legs and to control an on-state of at least one of said first switching leg and said fourth switching leg in response to said PWM signal to modulate current through a conduction path comprised of said first and fourth switching legs when said sign signal indicates a negative instantaneous output voltage.

46. The apparatus of claim 45 further comprising first, second, third and fourth gate drive circuits in communication with said first, second, third and fourth switching elements respectively and wherein the switching leg controller circuit includes a logic circuit operable to receive the PWM signal and the sign signal and has first, second, third and fourth gate drive outputs in communication with the first, second, third and fourth gate drive circuits respectively.

47. An inverter operable to supply high power factor electrical power to an AC load including an AC power grid, the inverter comprising:
  a DC bus having first and second DC terminals operable to be supplied with power from a DC source;
  a DC to AC converter section having:
    first and second switching legs connected to a first common AC output and said first and second DC terminals, respectively; and
    third and fourth switching legs connected to a second common output of the inverter and said first and second DC terminals respectively;
  a voltage sensor configured to produce an instantaneous output voltage signal representing instantaneous output voltage of the inverter;
  a first rectification circuit configured to produce a rectified output voltage signal in response to said instantaneous output voltage;
  a power signal generator for generating a power signal inversely proportional to an average amplitude of the rectified output voltage;
  an output current sensor configured for sensing an output current of the inverter to produce an instantaneous output current signal;
  a second rectification circuit configured to produce a rectified output current signal in response to said instantaneous output current signal;
  a sign circuit for producing a signal representing the sign of the instantaneous output voltage;
  a control apparatus comprising:
    a scaled rectified voltage signal generator configured to produce a scaled rectified voltage signal in response to said rectified output voltage signal, said power signal and a reference power signal, wherein said scaled rectified voltage signal generator includes a multiplier configured to multiply said rectified output voltage signal by a ratio of said reference power level signal to said power signal such that said scaled rectified voltage signal is a scaled version of said rectified output voltage signal that increases when said average amplitude of the rectified output voltage of the inverter increases, and decreases when said average amplitude of the rectified output voltage of the inverter decreases;

a pulse width modulation (PWM) signal generator configured to produce a pulse width modulation signal in response to said scaled rectified voltage signal and said rectified output current signal; and a switching leg controller circuit configured to control said first, second, third and fourth switching legs in response to said PWM signal and said sign signal such that current supplied by the inverter increases when said average amplitude of the rectified output voltage of the inverter increases, and decreases when said average amplitude of the rectified output voltage of the inverter decreases.

48. The inverter of claim 47, wherein said switching leg controller circuit is configured to shut off said first and fourth switching legs and to control an on-state of at least one of said second switching leg and said third switching leg in response to said PWM signal to modulate current through a conduction path comprised of said second and third switching legs when said sign signal indicates a positive instantaneous output voltage and to shut off said second and third switching legs and to control an on-state of at least one of said first switching leg and said fourth switching leg in response to said PWM signal to modulate current through a conduction path comprised of said first and fourth switching legs when said sign signal indicates a negative instantaneous output voltage.

49. The inverter of claim 48 further comprising first, second, third and fourth gate drive circuits in communication with said first, second, third and fourth switching legs respectively and wherein the switching leg controller circuit includes a logic circuit operable to receive the PWM signal and the sign signal and has first, second, third and fourth gate drive outputs in communication with the first, second, third and fourth gate drive circuits respectively.

50. The inverter of claim 49 wherein said scaled rectified voltage signal generator and said PWM signal generator include a common integrated circuit.

51. An inverter operable to supply high power factor electrical power to an AC load including an AC power grid, the inverter comprising:

a DC bus having first and second DC terminals operable to be supplied with power from a DC source;

a DC to AC converter section having:

first and second switching legs connected to a first common AC output and said first and second DC terminals, respectively; and third and fourth switching legs connected to a second common output of the inverter and said first and second DC terminals respectively;

means for producing a rectified output voltage signal representing rectified output voltage of the inverter;

means for generating a power signal inversely proportional to an average amplitude of the rectified output voltage;

means for producing a rectified output current signal representing instantaneous output current of the inverter;

means for producing a sign signal representing the sign of the output voltage;

a control apparatus comprising:

means for producing a scaled rectified voltage signal in response to said rectified output voltage signal, said power signal and a reference power signal, wherein said means for producing said scaled rectified output voltage signal is configured to multiply said rectified output voltage signal by a ratio of said reference power signal to said power signal such that said scaled rectified voltage signal is a scaled version of said rectified output voltage signal;

means for producing a pulse width modulation signal in response to said scaled rectified voltage signal and said rectified output current signal; and means for controlling said first, second, third and fourth switching legs in response to said PWM signal and said sign signal such that current supplied by the inverter increases when said average amplitude of the rectified output voltage of the inverter increases, and decreases when said average amplitude of the rectified output voltage of the inverter decreases.

52. The inverter of claim 51, wherein said means for controlling said first, second, third and fourth switching legs is configured to shut off said first and fourth switching legs and to control an on-state of at least one of said second switching leg and said third switching leg in response to said PWM signal to modulate current through a conduction path comprised of said second and third switching legs when said sign signal indicates a positive instantaneous output voltage and to shut off said second and third legs and to control an on-state of at least one of said first switching leg and said fourth switching leg in response to said PWM signal to modulate current through a conduction path comprised of said first and fourth switching legs when said sign signal indicates a negative instantaneous output voltage.

53. The inverter of claim 52 further comprising first, second, third and fourth gate drive circuits in communication with said first, second, third and fourth switching elements respectively and wherein the means for controlling said first, second, third and fourth switching legs includes a logic circuit operable to receive the PWM signal and the sign signal and has first, second, third and fourth gate drive outputs in communication with the first, second, third and fourth gate drive circuits respectively.

54. The inverter of claim 53 wherein said means for producing said scaled rectified voltage signal and said means for producing a PWM signal include a common integrated circuit.

* * * * *